United States Patent [19]

DuPuy et al.

[11] Patent Number: 5,153,930
[45] Date of Patent: Oct. 6, 1992

[54] DEVICE EMPLOYING A SUBSTRATE OF A MATERIAL THAT EXHIBITS THE PYROELECTRIC EFFECT

[75] Inventors: Richard E. DuPuy, Aloha; Harold R. Gilles, Portland; Edwin Boyd Osgood, Beaverton, all of Oreg.

[73] Assignee: Smiths Industries Aerospace & Defense Systems, Inc., Grand Rapids, Mich.

[21] Appl. No.: 460,759

[22] Filed: Jan. 4, 1990

[51] Int. Cl.⁵ .............................................. G02B 6/12
[52] U.S. Cl. ....................................... 385/8; 385/1; 385/4; 385/14; 385/130; 385/131; 385/132
[58] Field of Search ............... 427/126.1, 126.3, 126.4; 385/1, 2, 8, 11, 4, 130, 131, 132

[56] References Cited

U.S. PATENT DOCUMENTS

| | | | |
|---|---|---|---|
| 4,445,751 | 5/1984 | Divens et al. | 385/132 |
| 4,766,954 | 8/1988 | Bierlein et al. | 156/624 |
| 4,778,236 | 10/1988 | Miyawaki | 385/8 |
| 4,799,750 | 1/1989 | Miyawaki | 385/1 |
| 4,818,063 | 4/1989 | Takizawa | 385/8 |
| 4,880,288 | 11/1989 | Vatoux et al. | 385/14 |
| 4,925,263 | 5/1990 | Sanford et al. | 385/130 |
| 4,976,517 | 12/1990 | Kozuka et al. | 385/8 |

OTHER PUBLICATIONS

C. H. Bulmer et l., "Pyroelectric Effects in $LiNbO_3$ channel-waveguide devices", Appl. Phys. Lett., vol. 48 (16), 1036 (1986).
P. Skeath et al., "Novel electrostatic mechanism in the thermal instability of z-cut $LiNbO_3$ interferometers", Appl. Phys. Lett., vol. 49 (19) 1221 (1986).
I. Sawaki et al., "Thermally stabilized z-cut Ti: $LiNbO_3$ waveguide switch", Proceedings, Optical Fiber Communications Conference, 1987.

Primary Examiner—Georgia Y. Epps
Attorney, Agent, or Firm—Dellett, Smith-Hill and Bedell

[57] ABSTRACT

An article is manufactured from a substrate of a material that exhibits the pyroelectric effect by depositing a film containing a selected material in a first state over a front surface of the substrate. At least one electrode is formed on the film, portions of the film being exposed around the electrode. The exposed portions of the film are subjected to a treatment such that they are converted from the first state to a second state, in which the material has a resistivity that lies within a desired range of values.

27 Claims, 1 Drawing Sheet

DEVICE EMPLOYING A SUBSTRATE OF A MATERIAL THAT EXHIBITS THE PYROELECTRIC EFFECT

BACKGROUND OF THE INVENTION

This invention relates to a method of manufacturing a device employing a substrate of a material that exhibits the pyroelectric effect.

An important use of lithium niobate ($LiNbO_3$) is in fabrication of electrooptic devices. In a typical electrooptic device, optical waveguides are formed in a monocrystalline substrate of $LiNbO_3$ by diffusion of titanium into the crystal structure, and electrodes are deposited over a front surface of the substrate. Depending on the cut of the crystal, a buffer layer of $SiO_2$ may be interposed between the substrate and the electrodes. Also, a buffer layer may be deposited on the back surface of the substrate. A potential difference is established between the electrodes, and the electric field that is thereby created in the $LiNbO_3$ substrate influences the coupling of optical energy between the two waveguides.

A common use for an electrooptic device is as an optical switch. An optical switch may be used in an optical time domain reflectometer (OTDR) to direct light emitted from a light source into a fiber under test and direct reflected and back-scattered light from the fiber under test to a detector, depending on the field existing in the substrate. It is desirable that the field that affects the condition of the switch depend only on the potential difference between the electrodes.

$LiNbO_3$ exhibits the pyroelectric effect. When a crystal of $LiNbO_3$ undergoes a change in temperature, the pyroelectric effect causes a change in the spontaneous polarization of the material, and this produces a proportional electric field in the material along its Z-axis. Therefore, when the temperature of an optical switch based on $LiNbO_3$ changes, the behavior of optical modes propagating through the waveguides is influenced not only by the potential difference established between the electrodes but also by the pyroelectric field.

The pyroelectric effect is discussed in C. H. Bulmer, W. K. Burns and S. C. Hiser "Pyroelectric Effects in $LiNbO_3$ channel-waveguide devices", Appl. Phys. Lett., Vol. 48 (16), 1036 (1986), which confirms that the pyroelectric effect results in the performance of an electrooptic device based on $LiNbO_3$ being highly dependent on temperature.

The pyroelectric effect is discussed further in P. Skeath, C. H. Bulmer, S. C. Hiser and W. K. Burns, "Novel electrostatic mechanism in the thermal instability of z-cut $LiNbO_3$ interferometers", Appl. Phys. Lett., Vol. 49 (19), 1221 (1986), in which several possible methods to reduce the thermal instability of an electrooptic device are discussed. However, Skeath et al does not report on the efficacy of any of these methods.

The pyroelectric effect is self-extinguishing, since the pyroelectric field will result in charge being attracted to the Z faces of the substrate, and this charge will produce an electric field opposite in direction to the pyroelectric field. Given sufficient time (on the order of an hour in typical room air), an equilibrium state will be reached in which the accumulated surface charge produces a field that exactly cancels the pyroelectric field.

An integrated optic device, such as an optical switch, generally has conductive electrodes over some parts of its surface but not others. This inevitably causes the equilibrating process to proceed at a faster pace in the material directly underneath electrodes than in adjacent areas. There are two mechanisms for this. First, if the electrodes are connected to an external driver circuit, then a finite impedance will exist between them and "ground", where ground is any conductive material in the vicinity of the crystal (such as a metal package, or a block upon which the crystal sits). This finite impedance provides a path along which charge can move. Secondly, the sharp edges of the electrodes facilitate the ionization of surrounding air. As these mechanisms act, the surface charge density becomes different between regions with and without metal. Therefore, the electric field in the crystal will be different in the two regions. A plot of the field would show complicated fringing shapes at electrode edges. Waveguides located in various positions with respect to electrode edges will be subjected to various field strengths, so waveguide coupling will be disturbed as though a complex external field had been applied.

The equilibrating process can be made essentially instantaneous if the Z faces of the crystal are covered by conductive films and the films are electrically connected during the temperature change, since the conductive films contain mobile charge carriers that will respond immediately to the pyroelectric field by redistributing between the surfaces so as to cancel the pyroelectric field.

In I. Sawaki, H. Nakajima, M. Seino and K. Asama, "Thermally stabilized z-cut Ti: $LiNbO_3$ waveguide switch", Proceedings, Optical Fiber Communications Conference, 1987, it is proposed that a semi-insulating film of indium tin oxide (ITO) be provided over the front surface of the substrate of an electrooptic device, covering the electrodes and the exposed surface of the substrate. The ITO film reduces the resistance between the electrodes of the device by at least three orders of magnitude and results in a more uniform distribution of pyroelectric surface charge over the device. A disadvantage of the structure disclosed by Sawaki et al arises from the difficulty of ensuring a continuous film of ITO over the front surface of the substrate, since the electrodes cause step coverage problems and the small spacing between the electrodes makes it difficult to deposit material between the electrodes.

SUMMARY OF THE INVENTION

In accordance with a first aspect of the invention there is provided a method of manufacturing an article, comprising providing a substrate of a material that exhibits the pyroelectric effect, depositing a film containing a selected material in a first state over a front surface of the substrate, and subjecting portions of the film to a predetermined treatment such that they are converted from the first state to a second state in which the material has a resistivity that lies within a desired range of values.

In accordance with a second aspect of the invention there is provided an article of manufacture comprising a substrate of a material that exhibits the pyroelectric effect and has a front surface, a film containing a selected material over the front surface of the substrate, the selected material having a first state, in which its resistivity lies within a desired range of values, and a second state, in which its resistivity lies outside that range of values, and at least one electrode overlying the film while leaving portions of the film exposed, the portions of the film that lie beneath the electrode being in the second state and the portions that are exposed being in the first state.

BRIEF DISCUSSION OF THE DRAWINGS

For a better understanding of the invention, and to show how the same may be carried into effect, reference will now be made, by way of example, to the accompanying drawings in which:

FIGS. 1A-1C are sectional views illustrating successive stages in fabrication of an electrooptic switch, and FIG. 2 is a top plan view of the completed switch.

DETAILED DESCRIPTION

Figure 1A:
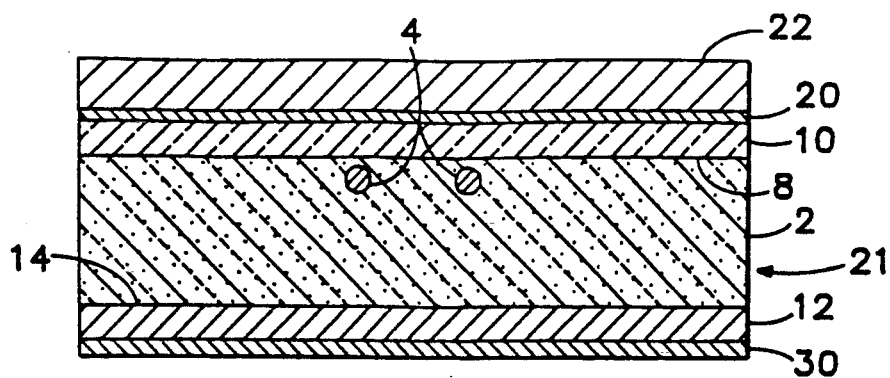

FIG. 1A illustrates a substrate 2 of z-cut monocrystalline $LiNbO_3$. Substrate 2 is one of several identical substrates that are formed from a monocrystalline wafer of z-cut $LiNbO_3$. Using conventional techniques, two diffused titanium waveguides 4 are formed in substrate 2 beneath its front surface 8. Formation of diffused Ti waveguides in $LiNbO_3$ typically involves treatment at temperatures on the order of 1,000° C. After formation of the waveguides, a buffer layer 10 of $SiO_2$ is formed over front surface 8 by chemical vapor deposition. When layer 10 is formed on front surface 8, a buffer layer 12 is formed over the back surface 14 of substrate 2. However, layer 12 is not necessary to the operation of the illustrated device.

Figure 1B:
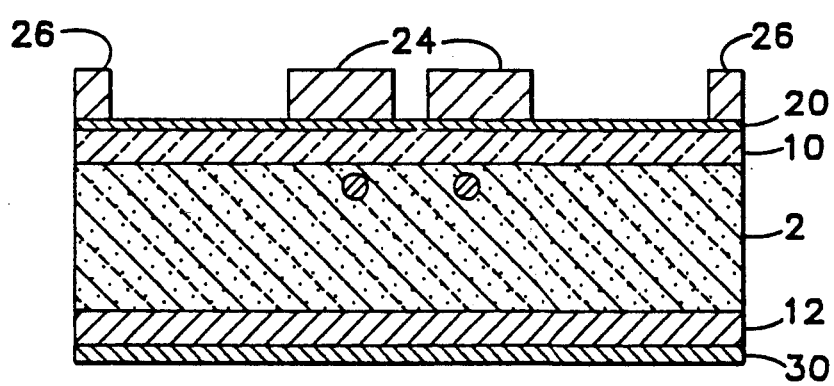
Figure 1C:
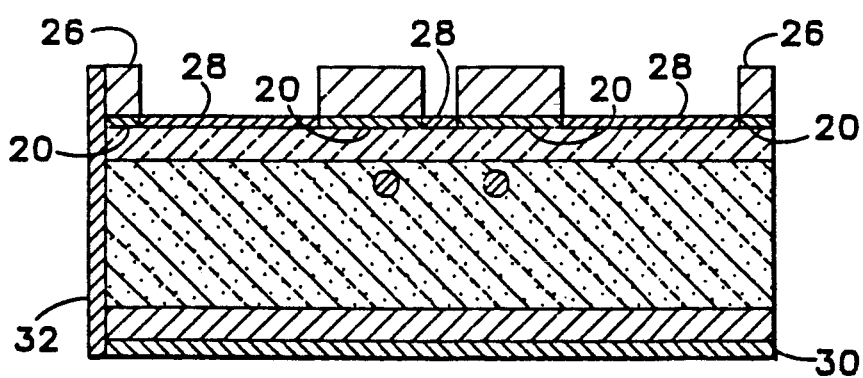

A thin film 20 of Ti, typically having a thickness in the range from about 100 to 200 Å, is deposited over the front surface of the die 21 composed of substrate 2 and buffer layers 10, 12, and a continuous layer 22 of Al is deposited over film 20. A continuous layer 30 of Al is deposited over buffer layer 12. As shown in FIG. 1B, layer 22 is patterned using standard photolithographic techniques to define two discrete electrodes 24 and a ring 26 that extends around the periphery of film 20. In the state shown in FIG. 1B, film 20 is highly conductive, so that the electrical resistance between electrodes 24 is negligible.

Figure 2:
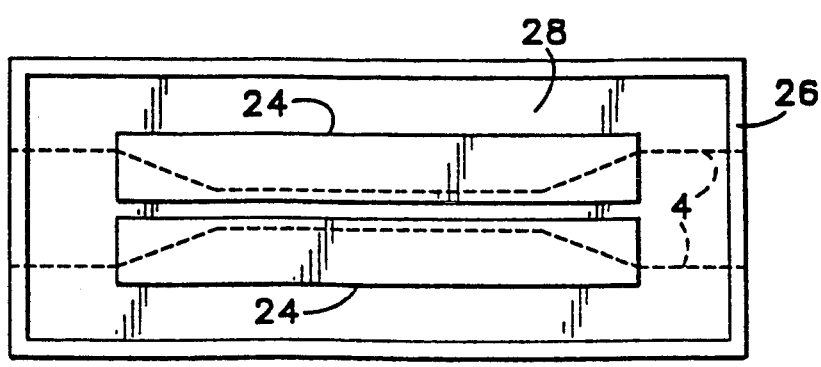

The structure shown in FIG. 1B is baked in an atmosphere of oxygen and nitrogen. During the baking operation, in which temperatures in excess of about 250° C. are attained, exposed portions 28 of metallic film 20 are converted to a high resistivity state. After the baking operation, the wafer is diced, and a stripe 32 of conductive paint is applied to the side of die 21 to connect ring 26 to layer 30. The completed optical switch is shown in FIG. 2.

When a temperature change causes a pyroelectric field to be generated between the faces of substrate 2, stripe 32 allows charge to be redistributed between films 20 and 30 to produce a counteracting field so that there is no net field in the substrate. This occurs within a time on the order of milliseconds. Therefore, the time required to achieve equilibrium between the pyroelectric field and the field due to surface charge is very short, and for most purposes no instability in performance of the switch due to change in temperature is observed. The high resistivity of portions 28 of film 20 prevents excessive power dissipation when voltage is applied between electrodes 22.

Preferably, the baking operation is composed of at least one baking cycle, which comprises a heat-up phase, a constant temperature phase and a cool-down phase. The maximum temperature that is attained during the baking operation may be in the range from about 350° C. to about 400° C., which is sufficiently low that the properties of the diffused waveguides are not affected significantly.

In the preferred process, the heat-up phase lasts about 15 minutes and the constant temperature phase of the first baking cycle lasts about 30 minutes. Cooling to 250° C. is controlled to take place quite slowly, e.g. over a period of 70 minutes, because conversion of the metallic film to its high resistivity state continues at a significant rate until the temperature falls below about 250° C.. The cooling may be accelerated after the initial portion of the cool-down phase. At the end of the cool-down phase, the resistivity of exposed portions 28 is measured. If the resistivity is in the desired range, which may be, for example, 1E7 to 1E11 ohms per square, the baking operation is discontinued. Otherwise, a second baking cycle is performed, and the length of the constant temperature phase of the second cycle depends on how close the measured value of the resistivity is to the desired range of values.

By depositing the titanium film before the electrode metal, a continuous film is provided in the narrow gap between the electrodes and step coverage problems are avoided.

The baking operation does not affect the portions of layer 20 that lie beneath electrodes 24 and ring 26. The nature of the change in the exposed portions of film 20 that takes place during the baking operation is not fully understood. The composition of exposed portions 28 of converted film 20 was measured by electron scanning chemical analysis, in which material is progressively removed by sputtering and the composition of the exposed material is measured by auger analysis. It was found that for small depths, portions 28 contain titanium and oxygen in an approximately stoichiometric ratio, which suggests that portions 28 are titanium dioxide. For greater depths, Si, Ti and $O_2$ were found, indicating diffusion between buffer layer 10 and film 20, and they were present in the stoichiometric ratios of $SiO_2$ and $TiO_2$. These analysis results imply that exposed portions 28 would be electrically insulating. However, measurement of the resistance between electrodes 24 indicates that although the resistivity of portions 28 is much higher than the resistivity of metallic Ti, the material of portions 28 still exhibits a finite conductivity.

It will be appreciated that the invention is not restricted to the particular embodiment that has been described, and that variations may be made therein without departing from the scope of the invention as defined in the appended claims and equivalents thereof. For example, the invention is not restricted to application to an optical switch, but may also be applied to other electrooptic devices such as interferometers and modulators. Furthermore, the invention is not limited to use of titanium as the material of film 20, since other materials may be used in a similar process to achieve a similar result. The invention is not restricted to the particular process steps that have been described. Thus, layer 30 may be deposited after the wafer is diced, in which case layers of Al may be deposited simultaneously on the sides of the die so that the separate step of depositing paint stripe 32 is not required. Layer 30 need not be adhered directly to die 21, and its function may be provided by mounting die 21 on a metal plate. Treatments other than heating in an atmosphere containing oxygen may be used to modify the material of the film deposited on the front surface of the die to convert it to the state in which it has the desired resistivity. It is intended that the claims should not be interpreted as being limited to the treatment being performed in cycles, but to cover also methods in which the resistivity is measured throughout the treatment and the treatment is discontinued when the resistivity reaches the desired level.

We claim:

1. A method of manufacturing an electrooptic device, comprising:
    (a) providing a substrate of an electrooptic material that exhibits the pyroelectric effect, the substrate having a waveguide formed therein beneath a top surface thereof,
    (b) forming an insulating buffer layer over the top surface of the substrate, the buffer layer having a bottom surface that confronts the top surface of the substrate and also having a top surface,
    (c) depositing a film containing a selected material in a low resistivity state over the top surface of the buffer layer, said material being convertible from its low resistivity state to a high resistivity state on being subjected to a predetermined treatment,
    (d) forming at least one electrode on a first region of said film while leaving a second region of said film exposed, said electrode being positioned so that a line that is normal to the top surface of the substrate and passes through the waveguide also passes through the electrode, and
    (e) exposing said second region of said film to a predetermined agent under conditions such that said second region of the film is subjected to said predetermined treatment, said first region of the film being masked from the predetermined agent by the electrode and therefore not subjected to said predetermined treatment.

2. A method according to claim 1, wherein said first region of the film has first and second portions, and step (d) comprises forming first and second electrodes on said first and second portions respectively of said first region of the film, a portion of the second region of said film being exposed between said electrodes, and the electrodes being positioned so that a line that is normal to the top surface of the substrate and passes through the waveguide also passes through the first electrode.

3. An article of manufacture, made by a method according to claim 2.

4. A method according to claim 1, wherein step (d) comprises depositing a layer of metal over said film and selectively removing said layer to form said electrode and a terminal portion.

5. A method according to claim 4, further comprising depositing a layer of conductive material over a bottom surface of the substrate and connecting said terminal portion to said layer of conductive material.

6. A method according to claim 1, wherein the material of the film deposited in step (c) is a refractory metal and the predetermined agent is oxygen.

7. A method according to claim 6, wherein the substrate provided in step (a) is $LiNbO_3$, the waveguide is a titanium-diffused waveguide and the refractory metal is titanium.

8. A method according to claim 1, wherein step (a) comprises providing a substrate of an electrooptic material that exhibits the pyroelectric effect and forming a waveguide therein by diffusion of titanium into the substrate, the material of the film deposited in step (c) is titanium, and the predetermined agent is oxygen.

9. A method according to claim 8, wherein the buffer layer is $SiO_2$ and said predetermined treatment comprises heating in the presence of said predetermined agent.

10. A method according to claim 1, further comprising depositing a layer of conductive material over a bottom surface of the substrate and connecting said layer electrically to said film.

11. An article of manufacture, made by a method according to claim 1.

12. A method according to claim 1, wherein the substrate that is provided in step (a) has first and second waveguides formed therein, the first and second waveguides being spaced in a direction parallel to the top surface of the substrate, said first region of the film has first and second portions, and step (d) comprises forming first and second electrodes on said first and second portions respectively of said first region of the film, the electrodes being positioned so that a line that is normal to the top surface of the substrate and passes through the first waveguide also passes through the first electrode and a line that is normal to the top surface of the substrate and passes through the second waveguide also passes through the second electrode, a portion of the second region of said film being exposed between said electrodes.

13. An article of manufacture, made by a method according to claim 12.

14. A method of manufacturing an article, comprising:
    (a) providing a substrate of an electrooptic material that exhibits the pyroelectric effect, the substrate having a waveguide segment formed therein beneath a top surface thereof,
    (b) forming an insulating buffer layer over the top surface of the substrate, the buffer layer having a bottom surface that confronts the top surface of the substrate and also having a top surface,
    (c) depositing a film of refractory metal over the top surface of the buffer layer,
    (d) forming first and second electrodes on said film, portions of said film being exposed between said electrodes and the electrodes being positioned so that a line that is normal to the top surface of the substrate and passes through the waveguide segment also passes through the first electrode, and
    (e) heating said film in an oxidizing atmosphere.

15. A method according to claim 14, further comprising measuring the electrical resistance between the electrodes.

16. A method according to claim 14, wherein the electrooptic material is $LiNbO_3$, the buffer layer is $SiO_2$, the waveguide segment in the substrate is a titanium-diffused waveguide segment and the refractory metal deposited in step (c) is titanium.

17. An article of manufacture, made by a method according to claim 14.

18. A method according to claim 14, wherein the substrate provided in step (a) has first and second waveguide segments formed therein beneath the top surface thereof and spaced apart in a direction parallel to said top surface, and the electrodes that are formed in step (d) are positioned so that a line that is normal to the top surface of the substrate and passes through the first waveguide segment also passes through the first electrode and a line that is normal to the top surface of the substrate and passes though the second waveguide also pass through the second electrode.

19. An article of manufacture, made by a method according to claim 18.

20. An article of manufacture comprising:
   a substrate of an electrooptic material that exhibits the pyroelectric effect, the substrate having a top surface and there being a waveguide in the substrate beneath said top surface,
   an insulating buffer layer overlying the top surface of the substrate, the buffer layer having a bottom surface that confronts the top surface of the substrate and also having a top surface,
   a film over the top surface of the buffer layer, said film including a selected material and having a high resistivity region and a low resistivity region, and
   at least one electrode overlying the low resistivity region of said film while leaving the high resistivity region exposed, said electrode being positioned so that a line that is normal to the top surface of the substrate and passes through the waveguide also passes through the electrode.

21. An article according to claim 20, wherein the substrate has first and second waveguides formed therein beneath the top surface thereof, the low resistivity region of the film has first and second portions, and the article comprises first and second discrete electrodes overlying said first and second portions respectively of said low resistivity region of the film while leaving a portion of the high resistivity region exposed therebetween, said electrodes being positioned so that a line that is normal to the top surface of the substrate and passes through the first waveguide also passes through the first electrode and a line that is normal to the top surface of the substrate and passes through the second waveguide also passes through the second electrode.

22. An article according to claim 20, wherein the substrate has a bottom surface and the article comprises a layer of conductive material over the bottom surface of the substrate, the layer of conductive material being electrically connected to the film.

23. An article according to claim 22, wherein the low resistivity region of the film has a terminal portion, and the article comprises a terminal portion of metal overlying the terminal portion of said film, and conductive material connecting said terminal portion to the layer of metal.

24. An article according to claim 20, wherein the material of the substrate is LiNbO$_3$, the waveguide is a titanium-diffused waveguide and said selected material is titanium.

25. An article according to claim 24, wherein the buffer layer is SiO$_2$.

26. An article according to claim 20, wherein said selected material is a refractory metal.

27. An article according to claim 26, wherein the refractory metal is titanium.

* * * * *